Patented Sept. 3, 1946

2,407,131

UNITED STATES PATENT OFFICE 2,407,131

PLASTICS

Herman A. Bruson and George B. Butler, Philadelphia, Pa., assignors to Rohm & Haas Company, Philadelphia, Pa., a corporation of Delaware No Drawing. Application January 21, 1944, Serial No. 519,193

9 Claims. (Cl. 260—83)

This invention relates to explosive or readily combustible plastics and deals more particularly with trinitrophenylethyl esters of acrylic or of methacrylic acid and polymers thereof.

It is already known that traces of polynitroaromatic compounds, such as trinitrobenzene or trinitrotoluene, will inhibit or entirely suppress the polymerization of acrylic or methacrylic esters, for example, methyl acrylate or methyl methacrylate. It was surprising to discover, therefore, that the trinitrophenylethyl esters of acrylic or methacrylic acid polymerize readily to hard, tough plastics when these esters are heated with organic polymerization catalysts such as peroxides, for example, benzoyl peroxide. The nitroplastics thus obtained are useful for the preparation of military explosives.

In carrying out this invention, it has been found advantageous to prepare the monomeric esters by esterifying 2,4,6-trinitrophenylethanol with the acid chloride or anhydride of acrylic or methacrylic acid respectively. The 2,4,6-trinitrophenylethanol used is obtained by condensing TNT (trinitrotoluene) with formaldehyde. The monomeric esters obtained are crystalline solids having the general formula:

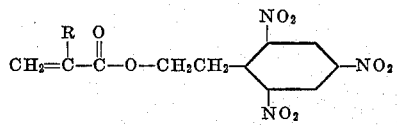

wherein R is a member of the group consisting of hydrogen and methyl.

The polymerization of these esters can be carried out at a temperature at which they are fluid, i. e., at or somewhat above their melting points, preferably at 95°–120° C., or in solution, as, for example, in acetone at the boiling point thereof. The peroxides which can be used include benzoyl, lauroyl, or other organic peroxide. The polymerization can also be carried out in aqueous suspension or emulsion, in which case ammonium persulfate can be used as polymerization catalyst.

The following examples illustrate this invention:

Example 1

2,4,6-trinitrophenylethyl acrylate.—To a vigorously stirred suspension of 21 grams (0.1 mol) of phosphorus pentachloride in 50 cc. of dry benzene was added 14.5 grams (0.2 mol) of acrylic acid from a dropping funnel while the temperature was kept below 10° C. The reaction mixture was then heated in a water bath at 30°–35° C. for one-half hour. It was then cooled to 20° C. and 26 grams (0.10 mol) of 2,4,6-trinitrophenylethanol added in solid form. Stirring was continued and the reaction mixture heated gradually to reflux and refluxed for one-half hour. After the mixture had been cooled, the solution was washed thoroughly with 10% $Na_2CO_3$ and water, and the benzene was removed under vacuum on a steam bath. The residue was a resinous material, but, after washing with dilute potassium hydroxide solution, it became a crystalline solid. It was recrystallized from methanol and melts, when pure, at 70° C. On heating at 100° C. with 1–5% of benzoyl peroxide, it polymerizes to a hard, brown resin which melts at 80°–90° C.

Example 2

2,4,6-trinitrophenylethyl methacrylate.—(A) To 10.4 grams (0.04 mol) of 2,4,6-trinitrophenylethanol was added 9.2 grams (0.06 mol) of methacrylic anhydride, and the reaction mixture was heated for one hour in an oil bath at 110°–120° C. After the mixture had been cooled, the resinous product was washed with .1 N sodium hydroxide solution to remove the excess anhydride and the acid formed in the reaction. After a thorough washing with cold water, the product became solid. It was recrystallized from ethanol. The pure ester melts at 94° C.

Analysis: Found: C=44.3%; H=3.60%; N=13.05%.

Calculated for $C_{12}H_{11}O_8N_3$: C=44.3%; H=3.39%; N=12.9%.

On heating the ester at 110°–120° C. with 2–5% of benzoyl peroxide, it polymerizes to a brown, viscous resin.

(B) 5.2 grams (0.02 mol) of 2,4,6-trinitrophenylethanol was dissolved in 50 cc. of dry benzene by heating, and a solution of 2.1 grams (0.02 mol) of methacrylyl chloride in 20 cc. of dry benzene was added dropwise to the refluxing solution. Refluxing was continued for two hours. After the mixture had been cooled, the solution was washed with aqueous soda solution and water and the solvent removed under reduced pressure on a steam bath. The product was recrystallized from ethanol and it melts at 94° C. It polymerizes in the same way as the product prepared by the anhydride method described above.

These resins burn with considerable vigor. When a flame is applied, they become fluid before igniting, but, after ignition, they burn continuously, leaving only a small carbonaceous residue. They are soluble in ketones but are insoluble in alcohols, hydrocarbons, and chlorinated solvents. They are particularly valuable as binders for other explosives in the manufacture of fuses, rockets, incendiary bombs, and related military explosives.

We claim:

1. As a new compound, a substance having in its monomeric form the formula:

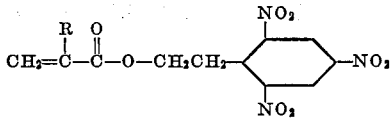

wherein R is a member of the group consisting of hydrogen and methyl.

2. As a new compound, a substance having in its monomeric form the formula:

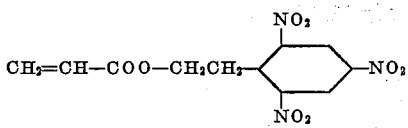

3. As a new compound, a substance having in its monomeric form the formula:

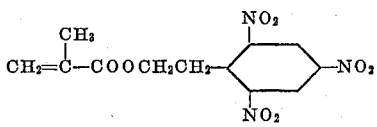

4. A polymer of an ester having in its monomeric form the formula:

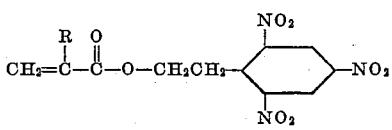

wherein R is a member of the group consisting of hydrogen and methyl.

5. A polymer of an ester having in its monomeric form the formula:

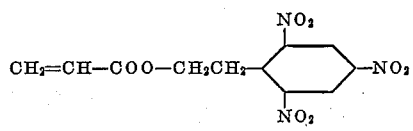

6. A polymer of an ester having in its monomeric form the formula:

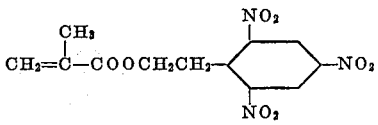

7. As a new compound, the ester:

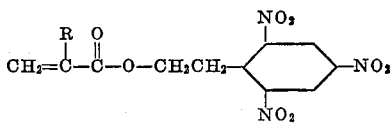

wherein R is a member of the group consisting of hydrogen and methyl.

8. As a new compound, the ester:

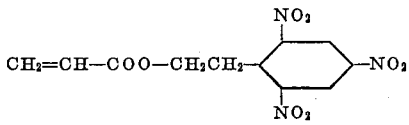

9. As a new compound, the ester:

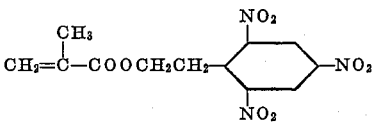

HERMAN A. BRUSON.
GEORGE B. BUTLER.